Feb. 5, 1929.
E. G. THOMAS
1,701,021
TESTING DEVICE
Filed June 23, 1923
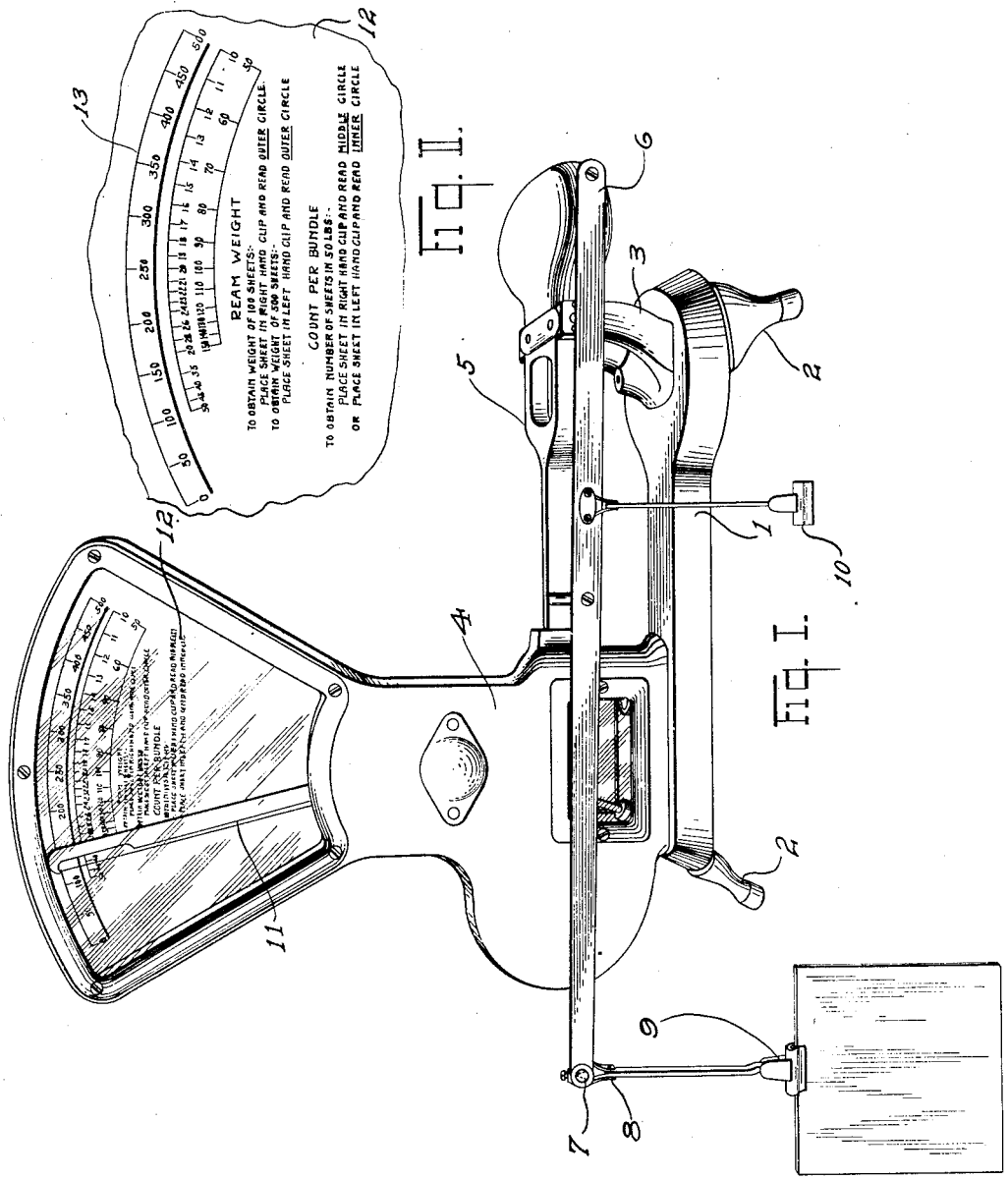
INVENTOR.
EDWARD G. THOMAS.
BY Marshall
ATTORNEY Patented Feb. 5, 1929.

1,701,021

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

TESTING DEVICE.

Application filed June 23, 1923. Serial No. 647,200.

This invention relates to testing devices, and one of its principal objects is the provision of means for determining by testing a single sheet of paper the weight of such paper per ream.

Another object is the provision of means for determining by testing a single sheet the weight of paper per one hundred sheets.

Still another object is the provision of means to determine the number of sheets in a bundle of given weight.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a perspective view of a testing device embodying my invention; and

Figure II is an enlarged fragmentary elevational view of a chart forming an element of the device.

In the embodiment illustrated, I have shown the invention as incorporating weighing mechanism substantially like that employed in fan type pendulum weighing scales. It is to be understood, however, that other types of weighing mechanism may be employed and that the embodiment shown is illustrative only.

The device as shown comprises a base 1 supported upon legs 2 and having a base horn or fulcrum stand 3 supported at one end of the base, while an upright housing 4 is supported upon the other end. Fulcrumed upon the base horn 3 is a lever 5 having connected thereto a beam 6 which extends to the left to a point considerably beyond the housing 4.

Fixed at the left end of the beam 6 is a pivot 7 from which depends a stirrup 8 connected to a clip 9 capable of supporting a sheet of paper. A similar clip 10 depends from a pivot located near the fulcrum of the lever. Since the device shown is intended to obtain the weight of one hundred sheets by testing one sheet and the weight of a ream of five hundred sheets by testing one sheet, the clip 10 is suspended from the lever at a point one-fifth the distance from the fulcrum to the pivot 7.

The end of the lever 5 extends into the housing 4 and is suitably connected in any preferred way with a load-counterbalancing pendulum, to which is secured an indicating hand 11. Since several ways of connecting scale levers to pendulums are well known, I have not considered it necessary to show the connection. The point on the lever which is connected to the pendulum is known as the nose of said lever.

The indicating hand 11 swings over a chart 12 which, as is clearly shown in Figure II, bears several concentric rows of indicia. The upper row or outer circle 13 is marked with figures indicating weights per ream of paper or weights per one hundred sheets. When a sheet of paper is placed in the clip 9 at the end of the beam, the indicating hand 11 indicates upon the outer circle the weight per ream of five hundred sheets. When a sheet of paper is placed in the clip 10—that is, the clip nearer the fulcrum of the lever—the indicator hand 11 indicates upon the outer circle the weight of one hundred sheets.

When the scale is used to obtain the count per bundle of fifty pounds and the sheets are relatively large, a sheet is hung in clip 10—the clip nearer the fulcrum of the lever—and the number of sheets is indicated by the indicator hand on the middle circle. If the sheets be of relatively light weight, one of them is placed in the clip at the end of the beam and the number of sheets in a bundle of fifty pounds is indicated by the indicator hand on the inner circle.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, weighing mechanism, including means for supporting a sheet of paper, an indicator hand, and a chart co-operating with said indicator hand, said chart being marked with indicia indicating weights per ream and indicia indicating counts per given weight.

2. In a device of the class described, in combination, a lever, a beam connected thereto and having one end extending beyond the nose of said lever, means carried at the extended end of said beam for supporting a specimen, automatic load-counterbalancing mechanism connected to said beam, an indicator connected to said load-counterbalancing mechanism, and a chart co-operating with said indicator, said chart being marked with various weights corresponding to a definite number of articles like the specimen.

3. In a device of the class described, in combination, a lever, a beam connected thereto and having one end extending beyond the nose of said lever, means carried at the extended end of said beam for supporting a specimen, automatic load-counterbalancing mechanism connected to said beam, an indicator connected to said load-counterbalancing mechanism, and a chart co-operating with said indicator, said chart being marked with various weights corresponding to a definite number of articles like the specimen and with various counts corresponding to a definite weight.

4. In a device of the class described, in combination, weighing mechanism, including means for supporting a specimen, means for automatically counterbalancing the weight of said specimen, and indicating mechanism, including a chart marked with various weights corresponding to a definite number of a commodity like the specimen being tested, said chart being also marked with various counts corresponding to a definite weight of such commodity.

5. In a device of the class described, in combination, weighing mechanism, including means for supporting a specimen, means for automatically counterbalancing the weight of said specimen, and indicating mechanism, including a chart marked with various counts corresponding to a definite weight of such commodity, the arrangement of said weighing and indicating mechanisms being such that when a specimen is placed upon the specimen supporting means the count of the definite weight will be indicated on the chart.

6. In a device of the class described, in combination, weighing mechanism, including a lever, means for supporting a sheet of paper at different distances from the fulcrum of said lever, an indicator hand, and a chart marked with indicia representing weights of counts of paper, the distances of said sheet-supporting means from the fulcrum of said lever being such that with the paper supported by one of said means, the weights indicated are weights per a certain count, and with the paper supported with the other of said means, the weights indicated are weights for another count.

7. In a device of the class described, in combination, a lever, a beam connected thereto and having one end extending beyond the nose of said lever, means carried at the extended end of said beam for supporting a specimen, automatic load-counterbalancing mechanism connected to said beam, an indicator connected to said load-counter-balancing mechanism, a chart co-operating with said indicator, and means carried on said beam between the fulcrum and nose of said lever for supporting a specimen, said chart being marked with various weights corresponding to a definite number of a commodity when a specimen is supported by the means at the extended end of said beam and a different number of a commodity with a specimen supported by the means between the nose and fulcrum of said lever.

EDWARD G. THOMAS.